United States Patent

Suito et al.

[11] Patent Number: 6,014,167
[45] Date of Patent: *Jan. 11, 2000

[54] TRACKING APPARATUS AND TRACKING METHOD

[75] Inventors: Taro Suito, Kanagawa; Tadafusa Tomitaka, Chiba; Takayuki Sakamoto; Koji Kageyama, both of Kanagawa, all of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,393

[22] Filed: Jan. 21, 1997

[30] Foreign Application Priority Data

Jan. 26, 1996 [JP] Japan ..................................... 8-011653

[51] Int. Cl.[7] ................................................. H04N 5/225
[52] U.S. Cl. ............................. 348/169; 348/94; 348/152
[58] Field of Search ..................................... 348/169, 170, 348/253, 94, 91, 92, 171, 172, 152, 234, 207, 208, 143, 155, 369; H04N 5/222

[56] References Cited

U.S. PATENT DOCUMENTS

| | | | |
|---|---|---|---|
| 5,119,205 | 6/1992 | Lemelson | 348/94 |
| 5,311,305 | 5/1994 | Mahadevan et al. | 348/169 |
| 5,355,163 | 10/1994 | Tomitaka | 348/253 |
| 5,384,594 | 1/1995 | Sieber et al. | 348/169 |
| 5,434,617 | 7/1995 | Bianchi | 348/170 |
| 5,473,369 | 12/1995 | Abe | 348/169 |
| 5,534,917 | 7/1996 | MacDougall | 348/169 |
| 5,546,125 | 8/1996 | Tomitaka et al. | 348/169 |

*Primary Examiner*—Bryan Tung
*Assistant Examiner*—Gims S. Philippe
*Attorney, Agent, or Firm*—Frommer Lawrence & Haug, LLP.; William S. Frommer

[57] ABSTRACT

The invention provides a tracking apparatus and a tracking method by which an imaging object can be set without any special manual operation by a user. An imaged image is supplied to an imaging object setting section via an imaging object processing section. In the imaging object setting section, a motion detection section calculates a difference value between images of successive two frames and detects a motion of an image based on the difference value. Then, a portion of the image from which the motion is detected is set as an imaging object to be tracked.

17 Claims, 9 Drawing Sheets

OBJECT COMPOSING PIXELS

FILTERING PROCESSING

FRAME INDICATING OBJECT REGION (OBJECT FRAME)

OBJECT POSITION (POSITION OF CENTER OF GRAVITY OF EXTRACTED PIXELS)

OBJECT FRAME

TRACKING APPARATUS AND TRACKING METHOD

BACKGROUND OF THE INVENTION

This invention relates to a tracking apparatus and a tracking method, and more particularly to a tracking apparatus and a tracking method suitable for use, for example, with a supervisory camera, a television conference system, a video camera which automatically tracks an imaging object or a like apparatus.

A video camera system has already been proposed wherein a pan driving mechanism and a tilt driving mechanism are used to automatically track an imaging object as an object of tracking so that the imaging object may be displayed, for example, at a central location of a display screen.

In a video camera of the type described above, for example, a reference measurement frame is provided at a central location of a display screen (image photographed or imaged by a video camera), and imaging is performed so that the imaging object as an object of tracking may be included in the reference measurement frame and the thus imaged image is stored into a memory, that is, an imaging object to be automatically tracked is set. Thereafter, from an image imaged by the video camera, the stored imaging object is detected, and when the imaging object is detected successfully, panning and tilting are performed so that the imaging object may be displayed at a central location of the display screen.

Further, when the imaging object is detected successfully, a region of the image outputted from the video camera which is occupied by the imaging object is displayed, for example, in a white saturated form so that the position of the imaging object may be recognized by a user.

On the other hand, if the imaging object is not detected successfully, that is, when the imaging object is missed, the image outputted from the video camera is displayed as it is.

A video camera system which performs such automatic tracking can be applied, for example, to a supervisory camera, a television conference system of the automatic speaker tracking type which automatically tracks any speaker and like systems, and is further used as effective means which allows an unmanned security system or allows hand-free photographing.

By the way, in a related art video camera, when a user intends to set an imaging object to be tracked, the user must manually operate the video camera so as to effect panning and/or tilting so that the image object may be included in a reference measurement frame.

In particular, although the user need not manually operate the video camera after the imaging object is set, in order to set the imaging object, the user must manually operate the video camera, which is cumbersome.

Further, with a related art video camera, if it becomes impossible to detect an imaging object any more during automatic tracking, then an image outputted from the video camera is not partially saturated with white but is displayed as it is as described above, and in this instance, it is difficult for the user to recognize that the imaging object is not detected.

SUMMARY OF THE INVENTION

It is an object of the present invention to provide a tracking apparatus and a tracking method by which an imaging object can be set without any special manual operation by a user.

It is another object of the present invention to provide a tracking apparatus and a tracking method by which a user can recognize readily that an imaging object is not detected.

In order to attain the objects described above, according to an aspect of the present invention, there is provided a tracking apparatus, comprising imaging means for imaging an imaging object, driving means for driving the imaging means to effect panning and tilting, imaging object setting means for setting the imaging object, imaging object detection means for detecting the imaging object set by the imaging object setting means from within an image outputted from the imaging means, and control means for controlling the driving means so that a position of the imaging object detected by the imaging object detection means may coincide with a predetermined reference position of the image outputted from the imaging means, the imaging object setting means including motion detection means for detecting motion of the image outputted from the imaging means, the imaging object setting means setting a portion of the image from which motion is detected by the motion detection means as the imaging object.

In the tracking apparatus, the motion detection means detects motion of an image outputted from the imaging means, and the imaging object setting means sets a portion of the image from which motion is detected by the motion detection means as the imaging object.

With the tracking apparatus, motion of an image outputted from the imaging means is detected, and a portion of the image from which the motion is detected is set as an imaging object. Accordingly, even if a user of the tracking apparatus does not perform any special manual operation for setting of an imaging object, an imaging object to be tracked can be set.

According to another aspect of the present invention, there is provided a tracking method for a tracking apparatus which includes imaging means for imaging an imaging object, driving means for driving the imaging means to effect panning and tilting, imaging object setting means for setting the imaging object, imaging object detection means for detecting the imaging object set by the imaging object setting means from within an image outputted from the imaging means, and control means for controlling the driving means so that a position of the imaging object detected by the imaging object detection means may coincide with a predetermined reference position of the image outputted from the imaging means, comprising the steps of detecting, by the imaging object setting means, motion of the image outputted from the imaging means, and setting, by the imaging object setting means, a portion of the image from which motion is detected by the imaging object setting means as the imaging object.

In the tracking method, the imaging object setting means detects motion of an image outputted from the imaging means and sets a portion of the image from which the motion is detected as an imaging object.

With the tracking method, motion of an image outputted from the imaging means is detected, and a portion of the image from which the motion is detected is set as an imaging object. Accordingly, even if a user of the tracking apparatus does not perform any special manual operation for setting of an imaging object, an imaging object to be tracked can be set.

According to a further aspect of the present invention, there is provided a tracking apparatus, comprising imaging means for imaging an imaging object, driving means for driving the imaging means to effect panning and tilting, imaging object detection means for detecting the imaging object from within an image outputted from the imaging means, control means for controlling the driving means so that a position of the imaging object detected by the imaging object detection means may coincide with a predetermined reference position of the image outputted from the imaging means, and frame display control means for causing, when the imaging object is detected by the imaging object detection means, a frame surrounding the imaging object to be displayed. When the imaging object is not detected, the display of the frame may be varied.

In the tracking apparatus, when an imaging object is detected by the imaging object detection means, the frame display control means causes a frame surrounding the imaging object to be displayed. When the imaging object is not detected, the display of the frame is varied. Consequently, the user can recognize or confirm a detection situation of an imaging object readily.

According to a still further aspect of the present invention, there is provided a tracking method for a tracking apparatus which includes imaging means for imaging an imaging object, driving means for driving the imaging means to effect panning and tilting, imaging object detection means for detecting the imaging object from within an image outputted from the imaging means, and control means for controlling the driving means so that a position of the imaging object detected by the imaging object detection means may coincide with a predetermined reference position of the image outputted from the imaging means, comprising the step of causing a frame surrounding the imaging object to be displayed when the imaging object is detected, but varying or stopping the display of the frame when the imaging object is not detected.

In the tracking method, when an imaging object is detected by the imaging object detection means, a frame surrounding the imaging object is displayed, but when the imaging object is not detected, the display of the imaging object is varied or stopped. Consequently, the user can recognize or confirm a detection situation of an imaging object readily.

According to a yet further aspect of the present invention, there is provided a tracking apparatus, comprising imaging means for imaging an imaging object, driving means for driving the imaging means to effect panning and tilting, imaging object detection means for detecting the imaging object from within an image outputted from the imaging means, control means for controlling the driving means so that a position of the imaging object detected by the imaging object detection means may coincide with a predetermined reference position of the image outputted from the imaging means, and character display control means for causing a predetermined character or characters to be displayed when the imaging object is not detected by the imaging object detection means.

In the tracking apparatus, when an imaging object is not detected by the imaging object detection means, the character display control means causes a predetermined character or characters to be displayed. Consequently, the user can recognize or confirm a detection situation of an imaging object readily.

According to a yet further aspect of the present invention, there is provided a tracking method for a tracking apparatus which includes imaging means for imaging an imaging object, driving means for driving the imaging means to effect panning and tilting, imaging object detection means for detecting the imaging object from within an image outputted from the imaging means, and control means for controlling the driving means so that a position of the imaging object detected by the imaging object detection means may coincide with a predetermined reference position of the image outputted from the imaging means, comprising the step of causing a predetermined character or characters to be displayed when the imaging object is not detected by the imaging object detection means.

In the tracking method, when an imaging object is not detected by the imaging object detection means, a predetermined character or characters are displayed. Consequently, the user can recognize or confirm a detection situation of an imaging object readily.

According to a yet further aspect of the present invention, there is provided a tracking apparatus, comprising imaging means for imaging an imaging object, driving means for driving the imaging means to effect panning and tilting, imaging object detection means for detecting the imaging object from within an image outputted from the imaging means, control means for controlling the driving means so that a position of the imaging object detected by the imaging object detection means may coincide with a predetermined reference position of the image outputted from the imaging means, and sound outputting means for outputting predetermined sound when the imaging object is not detected by the imaging object detection means.

In the tracking apparatus, when an imaging object is not detected by the imaging object detection means, the sound outputting means outputs predetermined sound. Consequently, the user can recognize or confirm a detection situation of an imaging object readily.

According to a yet further aspect of the present invention, there is provided a tracking method for a tracking apparatus which includes imaging means for imaging an imaging object, driving means for driving the imaging means to effect panning and tilting, imaging object detection means for detecting the imaging object from within an image outputted from the imaging means, and control means for controlling the driving means so that a position of the imaging object detected by the imaging object detection means may coincide with a predetermined reference position of the image outputted from the imaging means, comprising the step of outputting predetermined sound when the imaging object is not detected by the imaging object detection means.

In the tracking method, when an imaging object is not detected by the imaging object detection means, predetermined sound is outputted. Consequently, the user can recognize or confirm a detection situation of an imaging object readily.

According to a yet further aspect of the present invention, there is provided a tracking apparatus, comprising imaging means for imaging an imaging object, driving means for driving the imaging means to effect panning and tilting, imaging object detection means for detecting the imaging object from within an image outputted from the imaging means, control means for controlling the driving means so that a position of the imaging object detected by the imaging object detection means may coincide with a predetermined reference position of the image outputted from the imaging means, and light emitting means for emitting light when the imaging object is not detected by the imaging object detection means.

In the tracking apparatus, when an imaging object is not detected by the imaging object detection means, the light emitting means emits light. Consequently, the user can recognize or confirm a detection situation of an imaging object readily.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENT

Before a preferred embodiment of the present invention is described, in order to clearly indicate a corresponding relationship between various features of the invention set forth in the claims and the embodiment described hereinbelow, characteristics of the present invention will be described below with corresponding features of the embodiment, which are mere examples, added in parentheses thereto.

Figure 1:
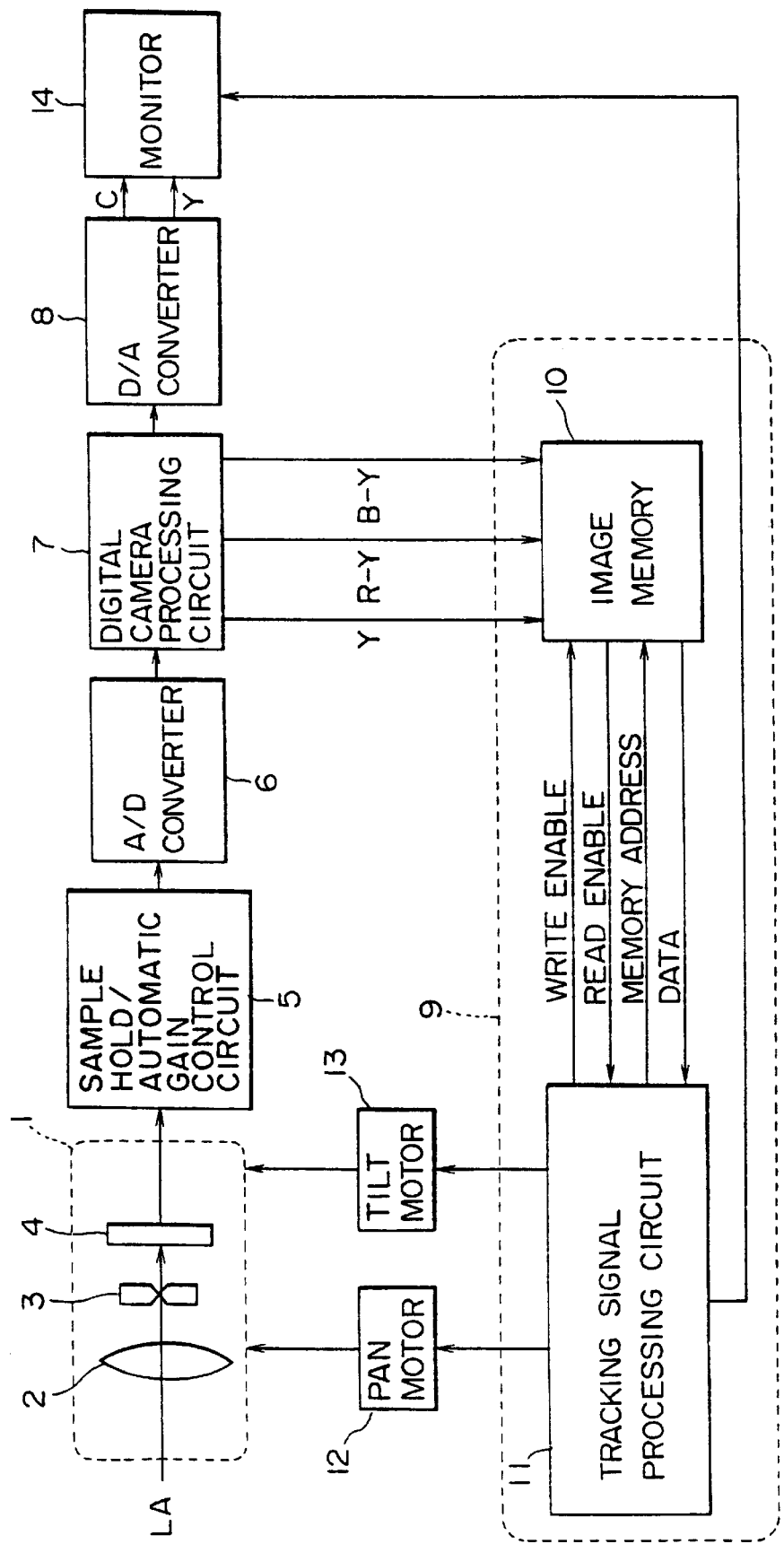
FIG. 1 is a block diagram showing a construction of a video camera system to which the present invention is applied.
Figure 2:
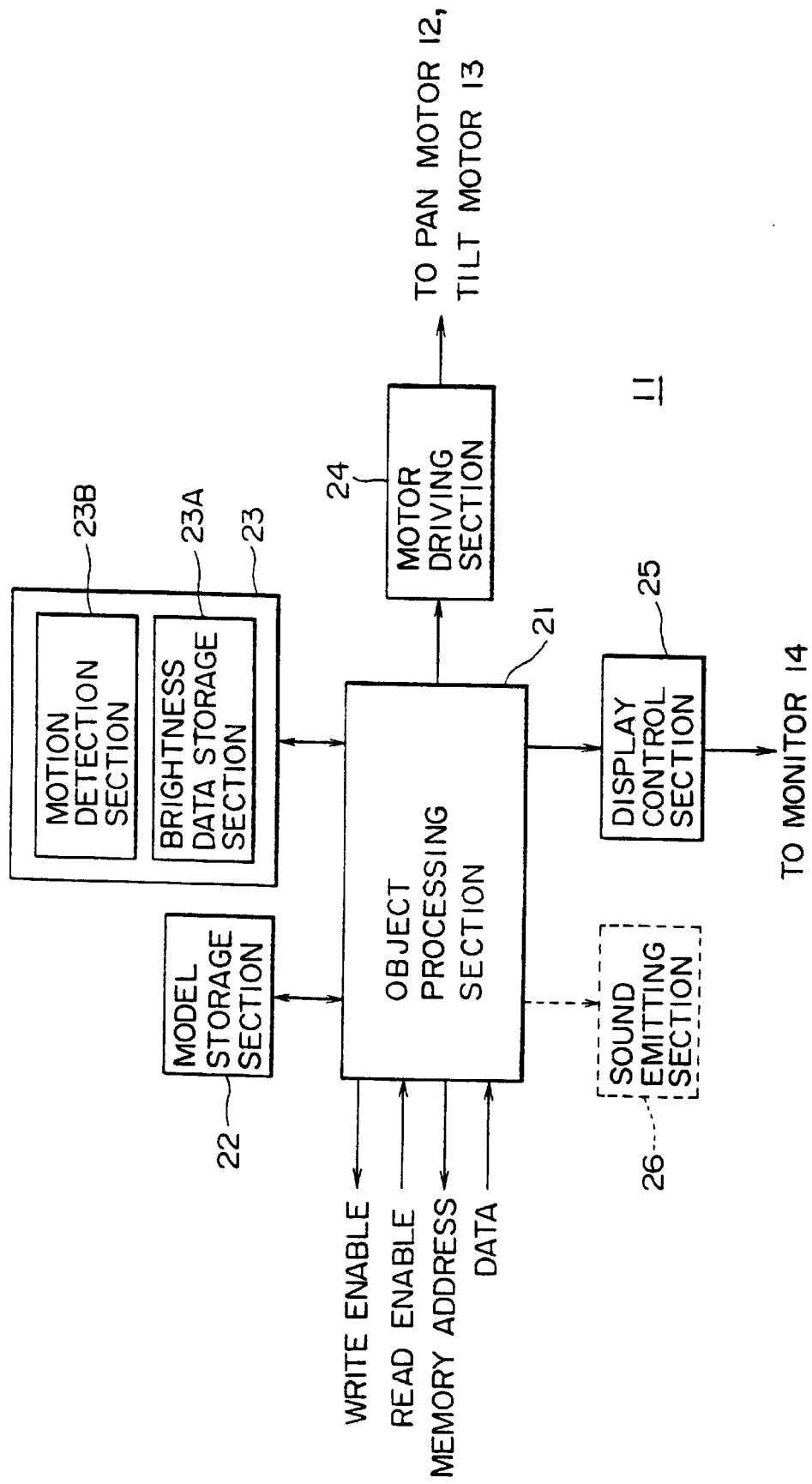
FIG. 2 is a block diagram showing a construction of a tracking signal processing circuit shown in FIG. 1.
Figure 5:
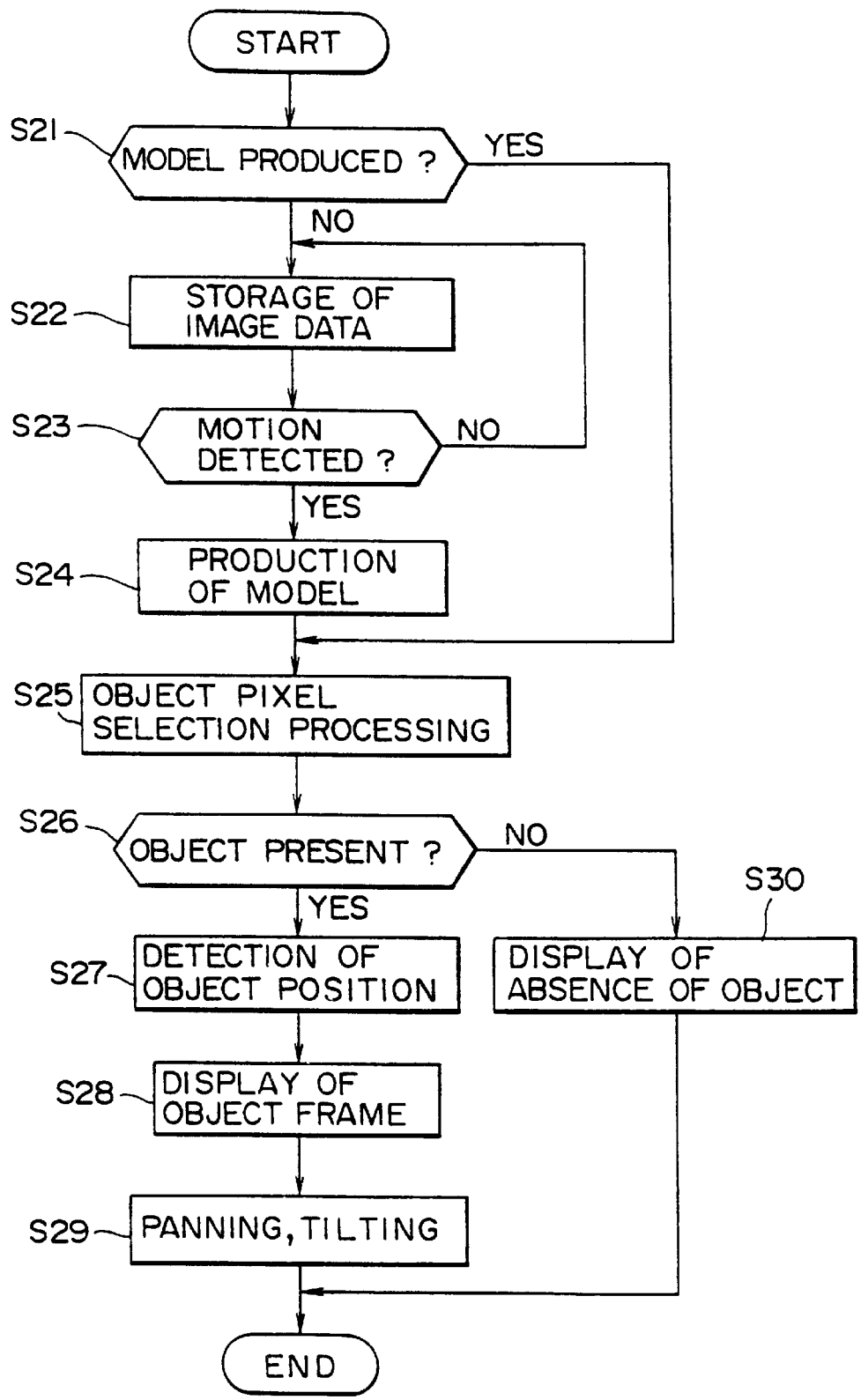
FIG. 5 is a flow chart illustrating details of processing in step S8 of FIG. 4.

In particular, according to claim 1, a tracking apparatus includes imaging means (for example, a lens block 1 and so forth shown in FIG. 1) for imaging an imaging object, driving means (for example, a pan motor 12, a tilt motor 13 and so forth shown in FIG. 1) for driving the imaging means to effect panning and tilting, imaging object setting means (for example, an imaging object setting section 23 and so forth shown in FIG. 2) for setting the imaging object, imaging object detection means (for example, an imaging object processing section 21 shown in FIG. 2, a processing step S25 of a program illustrated in FIG. 5 and so forth) for detecting the imaging object set by the imaging object setting means from within an image outputted from the imaging means, and control means (for example, a motor driving section 24 shown in FIG. 2, a processing step S29 of the program illustrated in FIG. 5 and so forth) for controlling the driving means so that a position of the imaging object detected by the imaging object detection means may coincide with a predetermined reference position of the image outputted from the imaging means, the imaging object setting means including motion detection means (for example, a motion detection section 23B shown in FIG. 2 and so forth) for detecting motion of the image outputted from the imaging means, the imaging object setting means setting a portion of the image from which motion is detected by the motion detection means as the imaging object.

According to claim 8, a tracking method for a tracking apparatus which includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object setting means (for example, the imaging object setting section 23 and so forth shown in FIG. 2) for setting the imaging object, imaging object detection means (for example, the imaging object processing section 21 shown in FIG. 2, the processing step S25 of the program illustrated in FIG. 5 and so forth) for detecting the imaging object set by the imaging object setting means from within an image outputted from the imaging means, and control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, includes the steps of detecting, by the imaging object setting means, motion of the image outputted from the imaging means, and setting, by the imaging object setting means, a portion of the image from which motion is detected by the imaging object setting means as the imaging object.

According to claim 9, a tracking apparatus includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, and frame display control means (for example, a display control section 25 shown in FIG. 2, processing steps S28 and S30 of the program illustrated in FIG. 5 and so forth) for causing, when the imaging object is detected by the imaging object detection means, a frame surrounding the imaging object to be displayed.

According to claim 14 or 15, a tracking method for a tracking apparatus which includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, and control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, includes the step of causing a frame surrounding the imaging object to be displayed when the imaging object is detected, but varying or stopping the display of the frame when the imaging object is not detected.

According to claim 16, a tracking apparatus includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, and character display control means (for example, the display control section 25 shown in FIG. 2 and so forth) for causing a predetermined character or characters to be displayed when the imaging object is not detected by the imaging object detection means.

According to claim 17, a tracking method for a tracking apparatus which includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, and control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, includes the step of causing a predetermined character or characters to be displayed when the imaging object is not detected by the imaging object detection means.

According to claim 18, a tracking apparatus includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, and sound outputting means (for example, a sound emitting section 26 shown in FIG. 2 and so forth) for outputting predetermined sound when the imaging object is not detected by the imaging object detection means.

According to claim 19, a tracking method for a tracking apparatus which includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, and control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, includes the step of outputting predetermined sound when the imaging object is not detected by the imaging object detection means.

According to claim 20, a tracking apparatus includes imaging means (for example, the lens block 1 and so forth shown in FIG. 1) for imaging an imaging object, driving means (for example, the pan motor 12, the tilt motor 13 and so forth shown in FIG. 1) for driving the imaging means to effect panning and tilting, imaging object detection means (for example, the imaging object processing section 21 shown in FIG. 2, the processing step S25 of the program illustrated in FIG. 5 and so forth) for detecting the imaging object from within an image outputted from the imaging means, control means (for example, the motor driving section 24 shown in FIG. 2, the processing step S29 of the program illustrated in FIG. 5 and so forth) for controlling the driving means so that a position of the imaging object detected by the imaging object detection means may coincide with a predetermined reference position of the image outputted from the imaging means, and light emitting means for emitting light when the imaging object is not detected by the imaging object detection means.

It is to be noted that naturally the foregoing description does not signify that the individual means are limited to those described above.

FIG. 1 shows a construction of a video camera system (VCS) to which the present invention is applied. A lens block 1 is composed of a lens 2, an iris 3 and a charge coupled device (CCD) 4, and images light LA from an imaging object and outputs an image signal in the form of an electric signal. In particular, the light LA from the imaging object is focused on the CCD 4 via the iris 3 by the lens 2 to form an image. Consequently, an image signal corresponding to a received light amount then is outputted from the CCD 4.

The iris 3 constructs an automatic iris (AE) mechanism and adjusts the amount of light to be received by the CCD 4 to a suitable value to place the exposure state of the lens block 1 into a suitable state.

The image signal outputted from the lens block 1 is sample held by a sample hold (S/H)/automatic gain control circuit (AGC) 5 and is then gain controlled in response to a control signal from the automatic iris mechanism so that it may have a predetermined gain, whereafter it is outputted to an A/D converter 6.

The A/D converter 6 performs A/D conversion of an image signal in the form of an analog signal from the sample hold/automatic gain control circuit 5 in response to a predetermined clock signal to form a digital image signal. It is to be noted that a reference voltage to be used for A/D conversion by the A/D converter 6 is supplied from an automatic white balance (AWB) mechanism not shown, and the white balance is adjusted appropriately with the reference voltage.

While, here in the present embodiment, the automatic iris mechanism and the automatic white balance mechanism function, imaging may otherwise be performed with a fixed exposure and a fixed white balance without causing the automatic iris mechanism and the automatic white balance mechanism to function.

The image signal obtained as a digital signal by the A/D converter 6 is supplied to a digital camera processing circuit 7. The digital camera processing circuit 7 produces, based on the image signal from the A/D converter 6, a brightness signal Y as well as color difference signals R-Y and B-Y and a chroma signal C for each of pixels which form an image corresponding to the image signal. The brightness signal Y and the chroma signal C are outputted to a D/A converter 8, by which they are converted from digital signals into analog signals, whereafter they are supplied to a monitor 14. Consequently, the image imaged by the lens block 1 is displayed on the monitor 14.

Meanwhile, the brightness signal Y and the color difference signals R-Y and B-Y produced by the digital camera processing circuit 7 are supplied to an imaging object recognition circuit section 9. The imaging object recognition circuit section 9 detects an imaging object to be tracked from within an image formed from the brightness signal Y and the color difference signals R-Y and B-Y from the digital camera processing circuit 7 and drives a pan motor 12 and a tilt motor 13 so that the imaging object may be displayed, for example, at a central location of an image outputted from the lens block 1.

In particular, the imaging object recognition circuit section 9 includes an image memory 10 of a frame memory configuration, and a tracking signal processing circuit 11 of a microprocessor configuration. The image memory 10 stores, when a write enable signal is received from the tracking signal processing circuit 11, a brightness signal Y and color difference signals R-Y and B-Y outputted from the digital camera processing circuit 7 independently of each other in units of a pixel.

It is to be noted that the color difference signal R-Y or B-Y will be hereinafter referred to simply as color difference signal R or B. Further, the position of the leftmost and uppermost pixel of an image outputted from the lens block 1 is represented as origin (0, 0), and the brightness signal Y and the color difference signals R and B of an ith and jth pixel rightwardly and downwardly of the position of the origin (0, 0) will be hereinafter referred to suitably as brightness signal Yij and color difference signals Rij and Bij, respectively. Further, the brightness signal Y and the color difference signals R and B will be hereinafter referred to suitably as image data collectively.

The image memory 10 outputs, after it stores image data for 1 frame (or 1 field), a read enable signal to the tracking signal processing circuit 11. Thereafter, when an address (which corresponds to i and j mentioned above) outputted from the tracking signal processing circuit 11 is received, the image memory 10 outputs image data stored at the address thereof to the tracking signal processing circuit 11.

When the read enable signal is received from the image memory 10, the tracking signal processing circuit 11 provides an address (memory address) to the image memory 10 as described above to read out image data necessary for tracking of an imaging object, and detects an imaging object to be tracked from within the image outputted from the lens block 1. Thereafter, the tracking signal processing circuit 11 supplies a write enable signal to the image memory 10. Consequently, another image imaged by the lens block 1 is stored newly into the image memory 10, that is, overwritten with the image stored already in the image memory 10.

Thereafter, the image memory 10 outputs a read enable signal as described above. Thus, the image memory 10 successively stores images imaged by the lens block 1 in a similar manner. It is to be noted that the stored contents of the image memory 10 are rewritten in such a manner as described above only after automatic tracking of an imaging object is started (that is, when processing beginning with step S25 of FIG. 5 which will be hereinafter described is performed), but before automatic tracking is started (that is, when processing in steps S22 and S23 of FIG. 5 which will be hereinafter described is performed repetitively), the stored contents of the image memory 10 are rewritten with an image outputted from the lens block 1, for example, in a frame period (or field period).

Further, when an imaging object is detected, the tracking signal processing circuit 11 drives the pan motor 12 and the tilt motor 13 so that the imaging object may be displayed at a central location of the image outputted from the lens block 1. Consequently, the lens block 1 is driven by the pan motor 12 and/or the tilt motor 13 to effect panning and/or tilting so that the imaging object is displayed at a central location of the image outputted from the lens block 1.

Further, when the imaging object is detected, the tracking signal processing circuit 11 causes the monitor 14 to display a frame (hereinafter referred to suitably as imaging object frame) which surrounds the imaging object.

FIG. 2 shows an exemplary functional construction of the tracking signal processing circuit 11. Referring to FIG. 2, an imaging object processing section 21 outputs a write enable signal and an address mentioned hereinabove to the image memory 10, and receives a read enable signal and image data and refers to a model storage section 22 to effect processing necessary for tracking of an imaging object. Further, the imaging object processing section 21 controls a motor driving section 24 and a display control section 25 in response to a result of the processing thereof. Furthermore, the imaging object processing section 21 produces an imaging object model (a modeled imaging object to be tracked) representative of a characteristic of an imaging object to be tracked, and stores the imaging object model into the model storage section 22.

The model storage section 22 stores an imaging object model produced by the imaging object processing section 21.

An imaging object setting section 23 includes a brightness data storage section 23A and a motion detection section 23B and sets an imaging object to be tracked. In particular, the brightness data storage section 23A successively stores, for example, a brightness signal Y from among image data Y, R and B read out from the image memory 10 by the imaging object processing section 21 one by one frame. The motion detection section 23B refers to the brightness data storage section 23A to calculate a difference value of images of two successive frames outputted from the lens block 1 and detects motion between the image based on the difference value. Then, if motion of an image is detected, then the motion detection section 23B sets a body displayed at a portion from which the motion is detected as an imaging object to be tracked, and outputs a result of the setting to the imaging object processing section 21.

The motor driving section 24 controls rotation of the pan motor 12 and the tilt motor 13 under the control of the imaging object processing section 21. The display control section 25 controls display of the monitor 14 under the control of the imaging object processing section 21.

Figure 3:
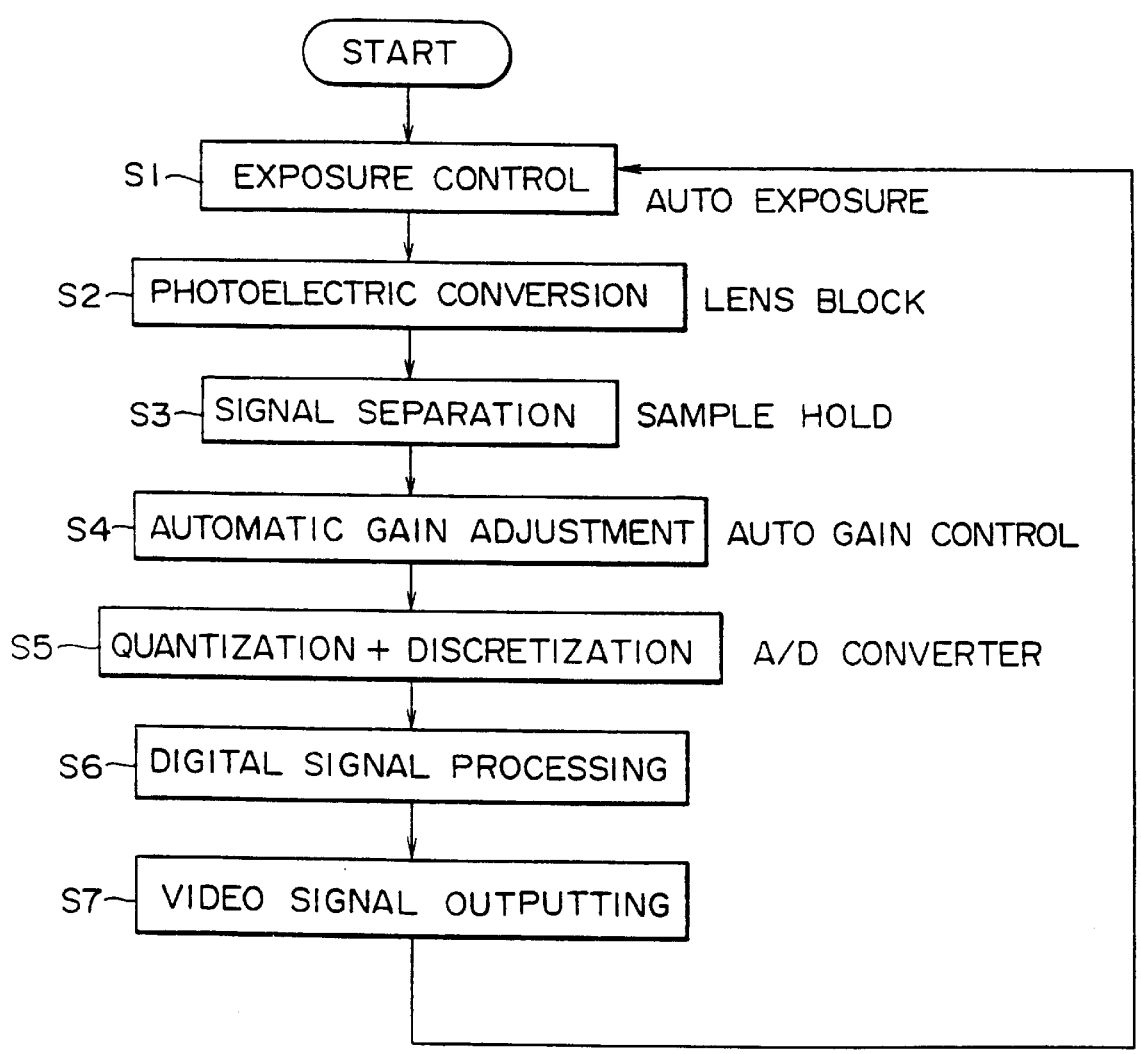
FIG. 3 is a flow chart illustrating operation of the video camera system of FIG. 1.

Subsequently, imaging processing of the video camera system of FIG. 1 will be described with reference to the flow chart of FIG. 3. First in step S1, the exposure of the lens block 1 is controlled to an appropriate condition, and then in step S2, light LA from an imaging object is photoelectrically converted by the CCD 4 to form an image signal in the form of an electric signal, whereafter the processing advances to step S3. In step S3, the image signal outputted from the CCD 4 is sample held (signal separation) by the sample hold/automatic gain control circuit 5, and then in step S4, the thus sample held image signal is gain controlled by the sample hold/automatic gain control circuit 5, whereafter the processing advances to step S5. In step S5, the gain controlled image signal is sampled and then quantized into a predetermined number of bits by the A/D converter 6 and then outputted to the digital camera processing circuit 7.

The digital camera processing circuit 7 performs digital signal processing for the image signal from the A/D converter 6 in step S6 to produce a brightness signal Y as well as color difference signals R and B and a chroma signal C for each of pixels which form an image corresponding to the image signal. Then, as described hereinabove, the brightness signal Y and the chroma signal C are outputted to the D/A converter 8, and the brightness signal Y and the color difference signals R and B are outputted to the imaging object recognition circuit section 9.

Thereafter, the processing advances to step S7, in which the brightness signal Y and the chroma signal C from the digital camera processing circuit 7 are converted from digital signals into analog signals by the D/A converter 8 and then supplied to and displayed on the monitor 14. Then, the processing returns to step S1 so that the processing beginning with step S1 is repeated.

Figure 4:
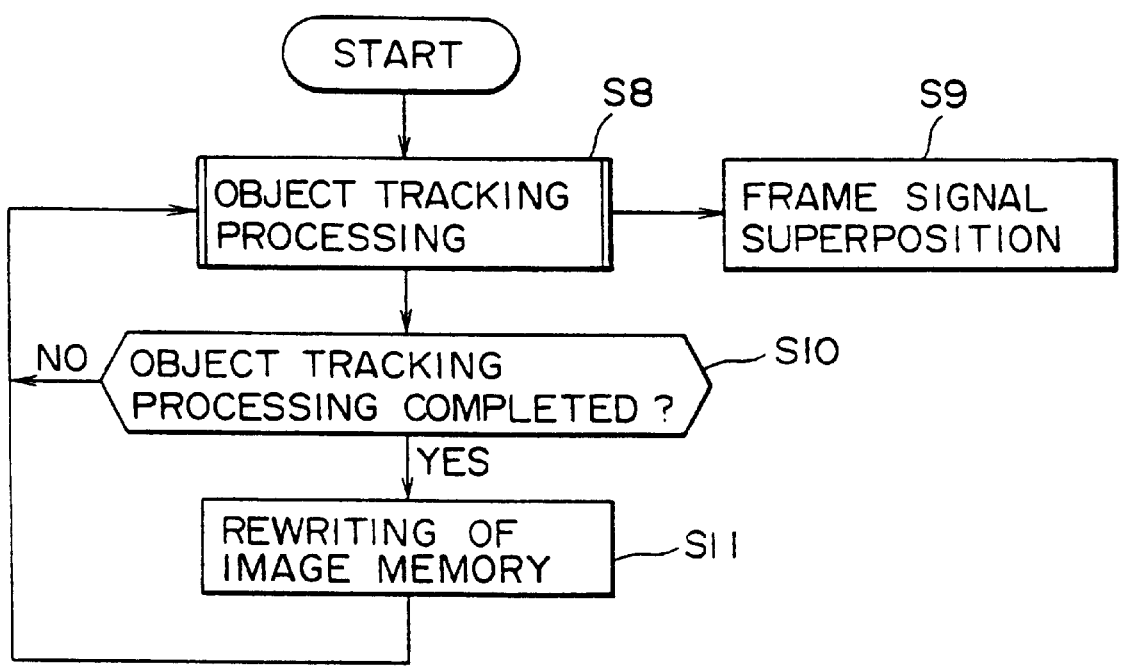
FIG. 4 is a flow chart illustrating operation of an imaging object recognition circuit section shown in FIG. 1.

Subsequently, processing of the imaging object recognition circuit section 9 will be described with reference to the flow chart of FIG. 4. In the imaging object recognition circuit section 9, imaging object tracking processing which will be hereinafter described is first performed in step S8 by the tracking signal processing circuit 11 so that an imaging object to be tracked is detected. Thereafter, the processing advances to step S10, in which it is discriminated by the tracking signal processing circuit 11 whether or not the imaging object tracking processing in step S8 is completed, and if it is discriminated that the imaging object tracking processing is not completed, then the processing returns to step S8.

On the other hand, if it is discriminated in step S10 that the imaging object tracking processing in step S8 is completed, then the processing advances to step S11, in which stored contents of the image memory 10 are rewritten in such a manner as described above with image data (a brightness signal Y and color difference signals R and B) supplied from the digital camera processing circuit 7, whereafter the processing returns to step S8.

It is to be noted that, when an imaging object to be tracked is detected successfully by the imaging object tracking processing in step S8, the tracking signal processing circuit 11 controls the monitor 14 in step S9 so that an imaging object frame surrounding the imaging object may be displayed.

Subsequently, the imaging object tracking processing in step S8 of FIG. 4 will be described with reference to the flow chart of FIG. 5. In the imaging object tracking processing, first in step S21, an imaging object to be tracked is set, and it is discriminated by the imaging object processing section 21 whether or not an imaging object model (characteristic model) corresponding to the imaging object is stored already in the model storage section 22. If it is discriminated in step S21 that an imaging object model is stored already, the processing advances to step S25 skipping steps S22 to S24.

On the other hand, when it is discriminated in step S21 that an imaging object model is not stored as yet, the processing advances to step S22, in which a brightness signal Y (brightness signal for one frame) of image data of a current frame read out from the image memory 10 is supplied to and stored into the brightness data storage section 23A by the imaging object processing section 21.

Then, the processing advances to step S23, in which the motion detection section 23B refers to the brightness data storage section 23A to discriminate whether or not the image outputted from the lens block 1 exhibits some motion.

In particular, the imaging object processing section 21 reads out, from the image memory 10, the brightness signal Y of an image of a frame next to the image whose brightness signal is stored in the brightness data storage section 23A, and supplies the brightness signal Y to the motion detection section 23B. The motion detection section 23B discriminates, where the brightness signal $Y_{ij}$ stored in the brightness data storage section 23A is represented as $YP_{ij}$ and the brightness signal $Y_{ij}$ of the image of the next frame is represented as $YN_{ij}$, for example, whether or not an absolute value sum of differences between the brightness signals $YP_{ij}$ and $YN_{ij}$ of the frames is higher than a predetermined threshold value. More particularly, it is discriminated whether or not the brightness signals $YP_{ij}$ and $YN_{ij}$ satisfy the following expression (1):

$$\Sigma |YN_{ij}-YP_{ij}|>\alpha \tag{1}$$

where $\Sigma$ represents summation for all of coordinates (i, j) of pixels which form an image of one frame, and $\alpha$ is a predetermined positive value.

When the brightness signals $YP_{ij}$ and $YN_{ij}$ do not satisfy the expression (1), it is discriminated in step S23 that the image outputted from the lens block 1 exhibits no motion. In this instance, the processing returns to step S22 so that the processing in steps S22 and S23 is repeated until after the image outputted from the lens block 1 exhibits some motion. It is to be noted that, in this instance, the brightness signal $YN_{ij}$ of the image of the next frame is stored as the brightness signal $YP_{ij}$ of the image of the current frame in step S22.

On the other hand, when the brightness signals $YP_{ij}$ and $YN_{ij}$ satisfy the expression (1), it is discriminated in step S23 that the image outputted from the lens block 1 exhibits some motion. In this instance, the motion detection section 23B detects those pixels (i, j) which exhibit some motion, that is, for example, those pixels (which will be hereinafter referred to suitably as moving pixels) which satisfy the following expression (2):

$$|YN_{ij}-YP_{ij}|>\beta \tag{2}$$

where $\beta$ is a positive value lower than $\alpha$.

Further, the motion detection section 23B detects, after it detects moving pixels, those moving pixels whose saturation degree (chroma) is higher than a predetermined threshold value $\gamma$. In particular, the motion detection section 23B detects those moving pixels which satisfy, for example, the following expression (3):

$$(R_{ij}^2+B_{ij}^2)^{1/2}>\gamma \tag{3}$$

where $\gamma$ is a predetermined positive value.

Then, the motion detection section 23B sets a body formed from the moving pixels which satisfy the expression (3) as an imaging object to be tracked.

Accordingly, by the motion detection section 23B, a body which exhibits some motion first within an image imaged by the lens block 1 after imaging by the lens block 1 is started, that is, after the power supply to the apparatus is switched on, is set as an imaging object to be tracked.

Since a body which moves first after the power supply to the apparatus is switched on is set as an object to be tracked as described above, a user need not perform any special manual operation for performing such setting. Further, since the necessity for provision of a block for performing such operation is eliminated, also simplification of the system can be achieved.

It is to be noted that the motion detection section 23B may set, in place of setting a body which moves first after the power supply to the apparatus is switched on as an imaging object to be tracked as described above, a body which moves first, for example, after a predetermined button is operated as an imaging object to be tracked.

After an imaging object to be tracked is set by the motion detection section 23B, a result of the setting is outputted to the imaging object processing section 21. When the result of setting of an imaging object is received from the motion detection section 23B, the imaging object processing section 21 produces, in step S24, an imaging object model corresponding to the imaging object (characteristic model representative of a characteristic of an imaging object).

In particular, since a set of points represented by groups $(Y_{ij}, R_{ij}, B_{ij})$ of the brightness signal $Y_{ij}$ and the color difference signals $R_{ij}$ and $B_{ij}$ as image data of the object body to be tracked represents the imaging object itself, an image object model is produced from the set of points. However, since the set of points $(Y_{ij}, R_{ij}, B_{ij})$ includes some noises and is a mere set of representative points representing the imaging object, if it is tried to detect image data which coincide with the set from within an image outputted from the lens block 1 to detect the imaging object, then it is difficult to detect an imaging object.

Therefore, in order to provide some width to the set of points $(Y_{ij}, R_{ij}, B_{ij})$, that is, in order to admit an allowance so that an imaging object may be detected even when a set of points different a little from the set of points $(Y_{ij}, R_{ij}, B_{ij})$ are obtained, sets of points $(Y_{ij}, HR_{ij}, LR_{ij})$ and $(Y_{ij}, HB_{ij}, LB_{ij})$ are calculated based on the set of points $(Y_{ij}, R_{ij}, B_{ij})$.

Here, $HR_{ij}$, $LR_{ij}$, $HB_{ij}$ and $LB_{ij}$ are calculated in accordance with the following expressions, respectively:

$$HR_{ij}=1.1 \times R_{ij}$$

$$LR_{ij}=0.9 \times R_{ij}$$

$$HB_{ij}=1.1 \times B_{ij}$$

$$LB_{ij}=0.9 \times B_{ij}$$

It is to be noted that, while the allowance in the expressions above is set to 10% (1+0.1 and 1−0.1), the allowance is not necessarily limited to 10%.

Figure 6A:
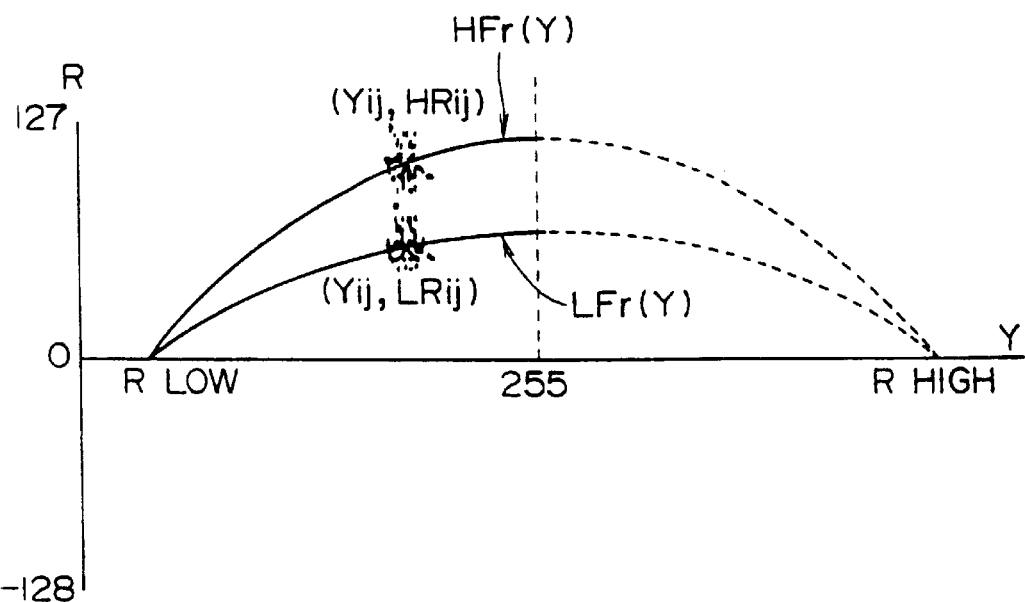
FIGS. 6A and 6B are diagrams illustrating a method of producing an image object model by the video camera system of FIG. 1.
Figure 6B:
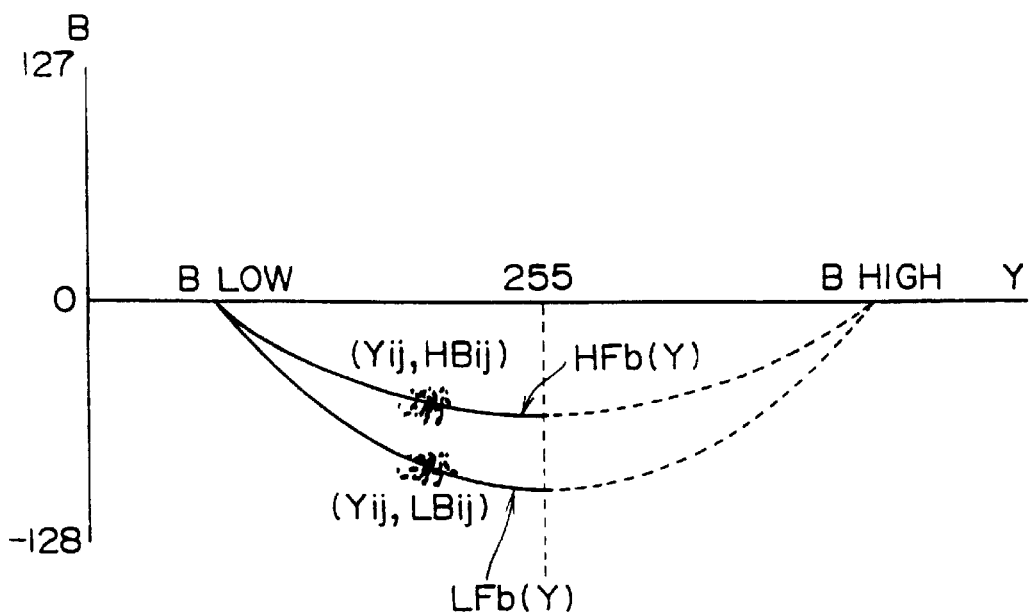

Here, a result of plotting of the points $(Y_{ij}, HR_{ij})$ and $(Y_{ij}, LR_{ij})$ on a coordinate system where Y and R are taken as the axis of abscissa and the axis of ordinate, respectively, is shown in FIG. 6A, and a result of plotting of the points $(Y_{ij}, HB_{ij})$ and $(Y_{ij}, LB_{ij})$ on another coordinate system wherein Y and B are taken as the axis of abscissa and the axis of ordinate, respectively, is shown in FIG. 6B. It is to be noted that, in the plots illustrated in FIGS. 6A and 6B, a value ranging from −128 to 127 is allocated as a value representing R or B.

After the sets of points $(Y_{ij}, HR_{ij}, LR_{ij})$ and $(Y_{ij}, HB_{ij}, LB_{ij})$ are obtained, an imaging object model wherein R or B is approximated, for example, with a quadratic function using Y as an argument is obtained.

Here in the present embodiment, in order that imaging object models (quadratic functions) which have somewhat approximate forms may be obtained from different imaging objects, the Y intercepts of a quadratic function, that is, points at which a curve of a quadratic function as an imaging object model crosses the Y axis, are determined depending upon the hue of the imaging object.

In particular, the imaging object processing section 21 stores a coordinate relationship between the hue of an imaging object and the Y intercepts of a quadratic function, and calculates a hue of an imaging object (for example, an average value in hue over the entire imaging object) from $R_{ij}$ and $B_{ij}$ and determines an imaging object model using the Y intercepts coordinated with the thus calculated hue.

More particularly, when the Y intercepts coordinated with a hue of a imaging object set now are, for the Y-R coordinate system, $R_{low}$ and $R_{high}$ (where $R_{low} < R_{high}$) as seen in FIG. 6A, but are, for the Y-B coordinate system, $B_{low}$ and $B_{high}$ (where $B_{low} < B_{high}$) as shown in FIG. 6B, constants A0, A1, A2 and A3 for determination of quatratic functions HFr(Y) (characteristic model of R with regard to Y), HFb(Y) (characteristic model of B with regard to Y), LFr(Y) (characteristic model of R with regard to Y) and LFb(Y) (characteristic model of B with regard to Y) as imaging object models represented by the following expressions, respectively, are calculated:

$$HFr(Y)=A0 \times (Y-R_{low}) \times (Y-R_{high})$$

$$HFb(Y)=A1 \times (Y-B_{low}) \times (Y-B_{high})$$

$$LFr(Y)=A2 \times (Y-R_{low}) \times (Y-R_{high})$$

$$LFb(Y)=A3 \times (Y-B_{low}) \times (Y-B_{high})$$

where the constants A0 to A3 are determined, for example, by a least square method using the sets of points $(Y_{ij}, HR_{ij})$, $(Y_{ij}, HB_{ij})$, $(Y_{ij}, LR_{ij})$ and $(Y_{ij}, LB_{ij})$, respectively.

The quadratic functions HFr(Y), LFr(Y) and HFb(Y), LFb(Y) obtained from such sets of points $(Y_{ij}, HR_{ij})$, $(Y_{ij}, LR_{ij})$ and $(Y_{ij}, HB_{ij})$, $(Y_{ij}, LB_{ij})$ as shown in FIGS. 6A and 6B are similarly shown in FIGS. 6A and 6B, respectively. It is to be noted that, in the quadratic functions illustrated in FIGS. 6A and 6B, the apexes of the curves of the quadratic functions HFr(Y) and LFr(Y) are positioned on a straight line of $Y=(R_{low}+R_{high})/2$, and the apexes of the curves of the quadratic functions HFb(Y) and LFb(Y) are positioned on another straight line of $Y=(B_{low}+B_{high})/2$. Further, in the quadratic functions illustrated in FIGS. 6A and 6B, both of $(R_{low}+R_{high})/2$ and $(B_{low}+B_{high})/2$ are equal to 255. Accordingly, the quadratic functions HFr(Y), HFb(Y), LFr(Y) and LFb(Y) illustrated in FIGS. 6A and 6B are all symmetrical with respect to Y=255.

The imaging object processing section 21 calculates, in step S24, the constants A0 to A3 which define quadratic functions of the imaging object model in such a manner as described above and stores the constants A0 to A3 and the Y intercepts $R_{low}$, $R_{high}$, $B_{low}$ and $B_{high}$ mentioned hereinabove into the model storage section 22.

It is to be noted that a method of extracting an imaging object from an image using an imaging object model defined in a brightness-color difference space (three-dimensional space represented by the brightness Y and the color differences R and B (in FIGS. 6A and 6B, the brightness-color difference space is shown in two separate planes of a Y-R two-dimensional plane and a Y-B two-dimensional plane in order to eliminate complicated illustration)) has been confirmed to be effective.

After an imaging object model is produced in such a manner as described above, the imaging object processing section 21 performs imaging object pixel selection processing in step S25 and discriminates in step S26 based on a result of the processing whether or not the imaging object is present in the image outputted from the lens block 1.

In particular, in step S25, from among pixels which form the image imaged by the lens block 1 and stored in the image memory 10, those pixels whose brightness $Y_{ij}$ and color difference signals $R_{ij}$ and $B_{ij}$ satisfy both of the following two expressions are detected:

$$LFr(Y_{ij}) < R_{ij} < HFr(Y_{ij})$$

$$LFb(Y_{ij}) < B_{ij} < HFb(Y_{ij})$$

where the quadratic functions $LFr(Y_{ij})$, $HFr(Y_{ij})$, $LFb(Y_{ij})$ and $HFb(Y_{ij})$ are defined by the imaging object model (constants A0 to A3 and Y intercepts $R_{low}$, $R_{high}$, $B_{low}$ and $B_{high}$) stored into the model storage section 22 in step S24.

In step S25, those pixels which satisfy the expressions above, that is, those pixels plotted between the two quadratic functions $LFr(Y_{ij})$ and $HFr(Y_{ij})$ shown in FIG. 6A and plotted between the two quadratic functions $LFb(Y_{ij})$ and $HFb(Y_{ij})$ shown in FIG. 6B, are detected as pixels forming the imaging object (such pixels will be hereinafter referred to suitably as imaging object composing pixels).

Thereafter, the processing advances to step S26, in which it is discriminated whether or not the imaging object is present in the image imaged by the lens block 1 and stored in the image memory 10. In particular, in step S26, a total number of the imaging object composing pixels detected in step S25 is compared with a predetermined threshold value δ. Then, when the number of imaging object composing pixels is larger than the predetermined threshold value δ, or when the number of imaging object composing pixels is smaller than the predetermined threshold value δ, it is discriminated in step S26 that the imaging object is present or absent in the image stored in the image memory 10.

If it is discriminated in step S26 that the imaging object is present, then the processing advances to step S27, in which the position of the imaging object is detected by the imaging object processing section 21.

Figure 7A:
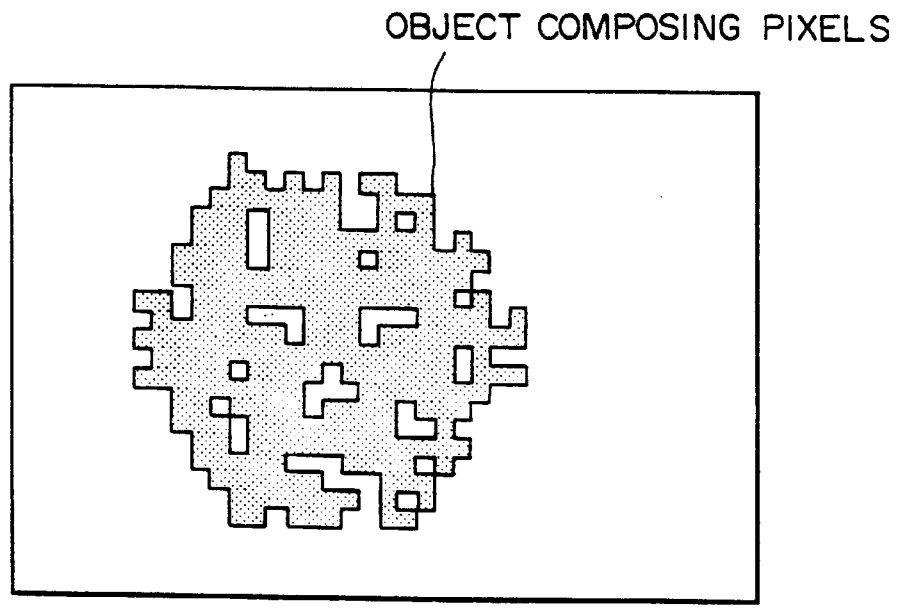
FIGS. 7A and 7B are schematic views illustrating processing in step S27 of FIG. 5.
Figure 7B:
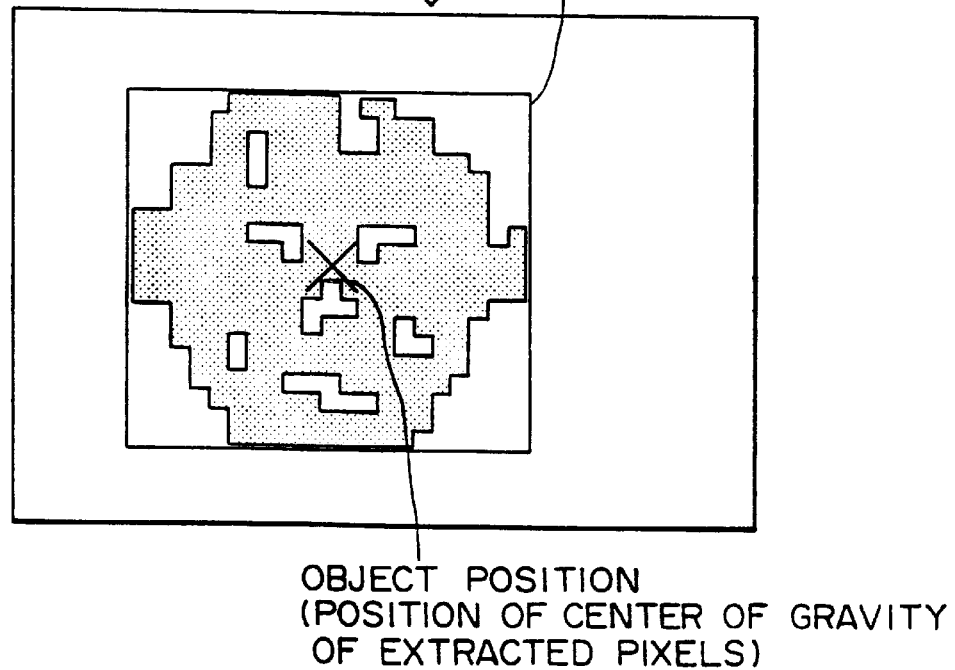

For example, if imaging object composing pixels are detected as shadowed in FIG. 7A in step S25 and then it is discriminated in step S26 that the imaging object is present, then in step S27, filtering processing is performed for a region formed from the imaging object composing pixels in order to remove, from among the imaging object composing pixels detected in step S25, those imaging object composing pixels which are located around the region formed from the imaging object composing pixels and may be noises. Consequently, the imaging object composing pixels shown in FIG. 7A change to such as shown in FIG. 7B. Further, in step S27, for example, the center of gravity of the set of imaging object composing pixels obtained as a result of the filtering, that is, for example, the center of gravity on an xy plane wherein the horizontal direction and the vertical direction are taken as the x axis and the y axis, respectively, is detected. The center of gravity thus detected is indicated by a mark x in FIG. 7B, and this is determined as the position of the imaging object.

Thereafter, the processing advances to step S28, in which the imaging object processing section 21 controls the display control section 25 so that a frame (which will be hereinafter referred to suitably as an imaging object frame) which surrounds the set of imaging object composing pixels obtained as a result of the filtering, for example, as indicated by a thick line in FIG. 7B. Thus, the display control section 25 controls the monitor 14 so that the imaging object frame may be displayed in a superimposed relationship on the image imaged by the lens block 1.

Figure 8A:
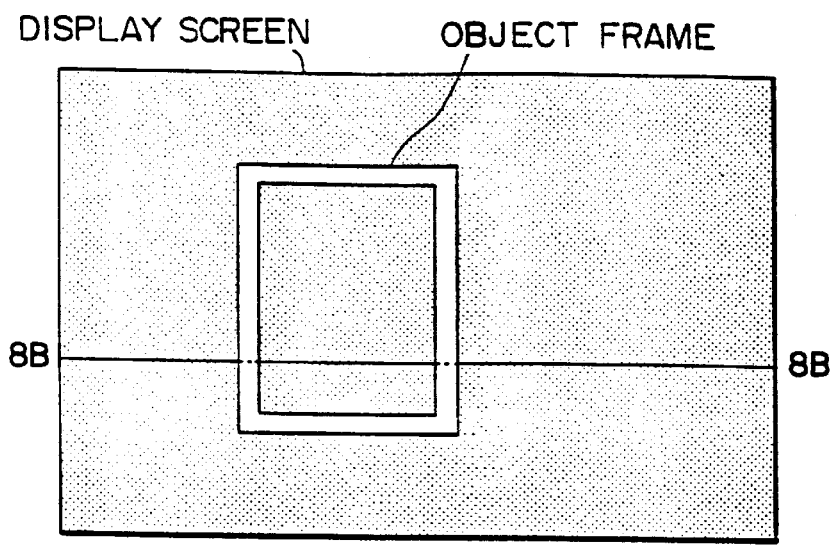
FIGS. 8A to 8C are diagrammatic views illustrating a display of an imaging object frame by the video camera system of FIG. 1.
Figure 8B:
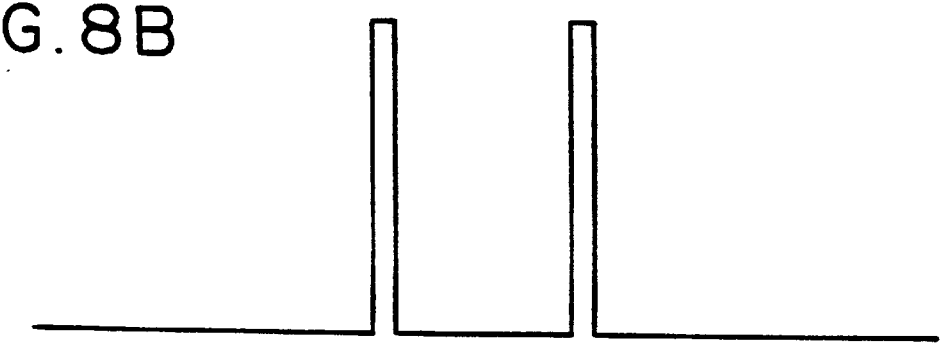

In particular, where such an imaging object frame as shown, for example, as a blank frame in FIG. 8A is to be displayed on the display screen of the monitor 14, such pulses (frame pulses) as seen from FIG. 8B are produced by the display control section 25. It is to be noted that FIG. 8B shows frame pulses for displaying an imaging object frame on a horizontal scanning line denoted at AA' in FIG. 8A.

Figure 8C:
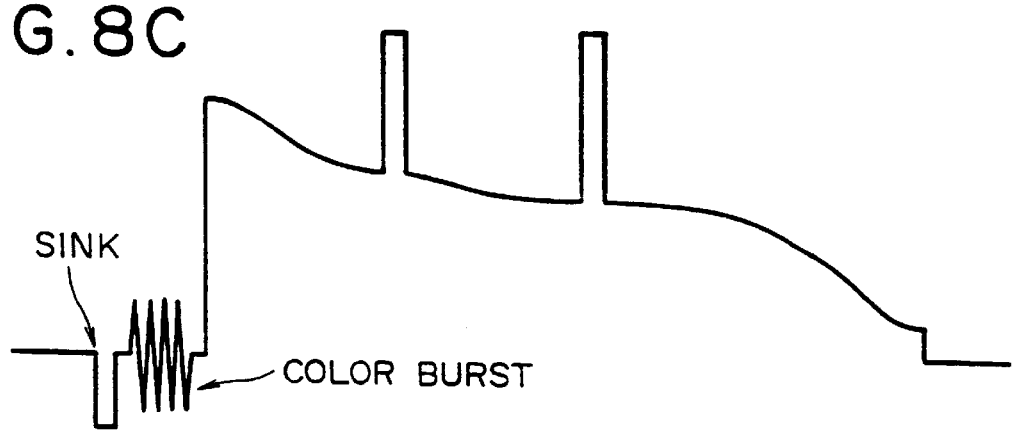
Figure 9A:
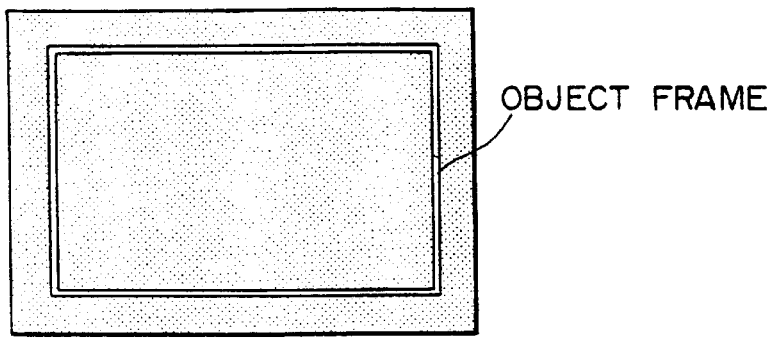
FIGS. 9A to 9D are schematic views illustrating a manner in which a display of an imaging object frame varies.
Figure 9B:
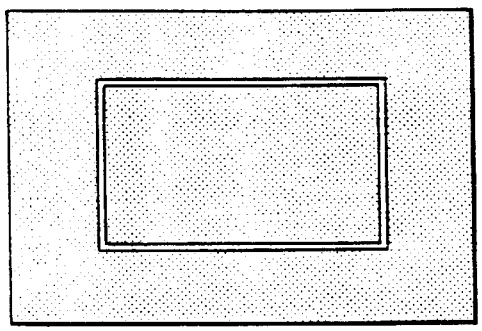
Figure 9C:
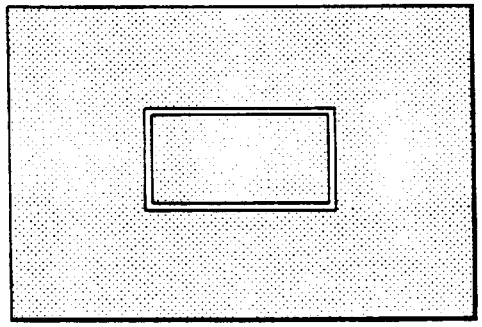
Figure 9D:
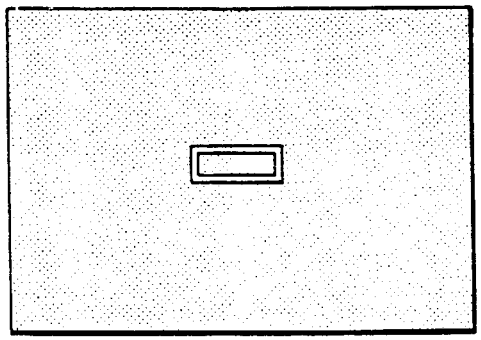

Then, the display control section 25 superposes the frame pulses on corresponding horizontal scanning lines of the image imaged by the lens block 1 as shown in FIG. 8C. Consequently, an imaging object frame is displayed in a superimposed relationship with the image imaged by the lens block 1 on the monitor 14.

Thereafter, the processing advances to step S29, in which the imaging object processing section 21 controls the motor driving section 24 so that the position of the imaging object detected in step S27 may coincide with the central position of the display screen of the monitor 14, that is, the image outputted from the lens block 1. On the other hand, the motor driving section 24 drives the pan motor 12 and the tilt motor 13 to rotate so that the lens block 1 is moved to effect panning and tilting so that the imaging object may be pulled in to the center of the display screen of the monitor, thereby ending the processing (imaging object tracking processing).

Automatic tracking of an imaging object is performed in such a manner as described above.

On the other hand, if it is discriminated in step S26 that the imaging object is not present, that is, when the imaging object is missed (when the imaging object cannot be extracted or detected from within the image outputted from the lens block 1), the processing advances to step S30, in which the display of the imaging object frame is varied into a condition in which it is apparently different from that when the imaging object is detected successfully.

In particular, in step S30, the imaging object processing section 21 controls the display control section 25 so that the display of the imaging object frame may be varied. Thus, the display control section 25 controls the monitor 14 to display the imaging object frame such that, for example, the size of it is successively varied at a fixed rate. Consequently, on the monitor 14, the imaging object frame is displayed while the size thereof is successively varied after each fixed interval of time, for example, in such a manner as shown in FIGS. 9A, 9B, 9C and 9D.

It is to be noted that, after the processing in step S30, for example, the direction in which the imaging object is present is predicted, and when the lens block 1 is panned and/or tilted to this direction, the imaging object racking processing is ended. Or, the lens block 1 is panned and/or tilted manually by a user to a direction in which the imaging object is present, thereby ending the imaging object tracking processing.

In this manner, when the imaging object is not detected successfully, the display of the imaging object frame is varied into another condition apparently different from that when the imaging object is detected successfully. Consequently, a user can discriminate readily that the imaging object is not detected. In other words, the user can recognize or discriminate a detection condition of the imaging object readily.

It is to be noted that, while, in the present embodiment, a brightness signal and color difference signals which are signals of one of three-color specification systems are used for production of an imaging object model and for detection of an imaging object, signals of some other system such as, for example, the RGB color specification system, the Lab color specification system, the Luv color specification system or the XYZ color specification system may be employed alternatively.

Further, while, in the present embodiment, an imaging object to be tracked is approximated with a quadratic function, on in other words, a quadratic function is used for an imaging object model, some other function may be employed for an imaging object model.

Further, while, in the present embodiment, the display control section 25 varies the size of the imaging object frame when the imaging object is not detected, some other displaying manner may be employed alternatively. For example, the imaging object frame may be displayed blinking or may be erased. Or else, for example, a message (characters) or a mark representing that the imaging object is not detected successfully may be displayed under the control of the display control section 25. Furthermore, as indicated by a dotted line in FIG. 2, a sound emitting section 26 which, for example, outputs voice representing that the imaging object is not detected successfully or outputs a predetermined beep sound may be provided such that, when the imaging object is not detected successfully, the sound emitting section 26 may output such voice or predetermined beep sound as mentioned above. Or, a light emitting element which emits light such as an LED may be provided at a location of the video camera system at which a user can visually observe readily such that, when the imaging object is not detected successfully, the light emitting element may be energized to emit light or emit blinking light.

Further, the method of detecting motion of an image is not limited to the specific method described hereinabove.

Having now fully described the invention, it will be apparent to one of ordinary skill in the art that many changes and modifications can be made thereto without departing from the spirit and scope of the invention as set forth herein.

What is claimed is:

1. A tracking apparatus, comprising:
   imaging means for generating a plurality of images;
   driving means for driving said imaging means to effect panning and tilting;
   imaging object setting means for detecting motion in an image and for setting a portion in said image in which said motion has been detected as an imaging object, said imaging object setting means including motion detection means for calculating a difference value of images of two successive frames generated by said imaging means and for detecting said motion of the image based on the calculated difference value such that said portion in said image in which said motion has been detected is initially set as said imaging object without user manipulation;
   imaging object detection means for detecting the imaging object set by said imaging object setting means in said plurality of images generated by said imaging means;
   control means for controlling said driving means so that a position of the imaging object detected by said imaging object detection means coincides with a predetermined reference position of said image generated by said imaging means; and
   frame display control means for superimposing a frame around said imaging object on said image when said imaging object detection means has detected said imaging object, said frame display control means modifying said frame if said imaging object is no longer detected.

2. The tracking apparatus as claimed in claim 1, wherein said motion detection means detects, in said image generated by said imaging means, said portion which exhibits said motion and has a saturation degree higher than a predetermined threshold value.

3. The tracking apparatus as claimed in claim 1, wherein said motion detection means detects, in said image generated by said imaging means, said portion which exhibits said motion and has a chroma higher than a predetermined threshold value.

4. The tracking apparatus as claimed in claim 1, wherein said imaging object setting means sets, as the imaging object, said portion of said image from which said motion is detected by said motion detection means immediately after a power supply to said tracking apparatus is switched on.

5. The tracking apparatus as claimed in claim 1, further comprising operation means, and wherein said imaging object setting means sets, as the image object, said portion of said image from which said motion is detected by said motion detection means after said operation means is operated.

6. The tracking apparatus as claimed in claim 1, wherein said control means controls said driving means so that the position of the imaging object detected by said imaging object detection means coincides with a central portion of said image generated by said imaging means.

7. A tracking method for a tracking apparatus which includes imaging means for generating a plurality of images, driving means for driving said imaging means to effect panning and tilting, imaging object setting means for setting an imaging object, imaging object detection means for detecting the imaging object set by said imaging object setting means in an image generated by said imaging means, and control means for controlling said driving means so that a position of the imaging object detected by said imaging object detection means coincides with a predetermined reference position of said image generated by said imaging means, said method comprising the steps of:
   detecting, by said imaging object setting means, said motion of the image generated by said imaging means by calculating a difference value of images of two successive frames generated by said imaging means such that said motion of the image is detected on the basis of the calculated difference value;
   setting, by said imaging object setting means, a portion in said image in which said motion has been detected by said imaging object setting means as the imaging object such that said portion in said image in which said motion has been detected is initially set as said imaging object without user manipulation;
   superimposing a frame around said imaging object on said image when said imaging object has been detected; and
   modifying said frame if said imaging object is no longer detected.

8. The tracking apparatus according to claim 1, wherein said frame display control means successively varies the size of the frame when the imaging object is not detected.

9. The tracking apparatus according to claim 1, wherein said frame display control means causes the displayed frame to blink when the imaging object is not detected.

10. The tracking apparatus according to claim 1, wherein said display frame control means stops the display of the frame when the imaging object is not detected.

11. The tracking method according to claim 8, further comprising
   stopping the display of the frame when the imaging object is not detected.

12. A tracking apparatus, comprising:

imaging means for generating a plurality of images;

driving means for driving said imaging means to effect panning and tilting;

imaging object detection means for detecting an imaging object in an image generated by said imaging means by calculating a difference value of images of two successive frames generated by said imaging means such that a motion of the image is detected on the basis of the calculated difference value, a portion in said image in which said motion has been detected being initially set as said imaging object without user manipulation;

control means for controlling said driving means so that a position of the imaging object detected by said imaging object detection means coincides with a predetermined reference position of said image generated by said imaging means; and character display control means for causing a predetermined character to be displayed when the imaging object is not detected by said imaging object detection means.

13. A tracking method for a tracking apparatus which includes imaging means for generating a plurality of images, driving means for driving said imaging means to effect panning and tilting, imaging object detection means for detecting an imaging object in an image generated by said imaging means, and control means for controlling said driving means so that a position of the imaging object detected by said imaging object detection means coincides with a predetermined reference position of said image generated by said imaging means, said method comprising the steps of:

detecting said imaging object in an image generated by said imaging means by calculating a difference value of images of two successive frames generated by said imaging means such that a motion of the image is detected on the basis of the calculated difference value, a portion in said image in which said motion has been detected being initially set as said imaging object without user manipulation;

providing a display; and causing a predetermined character to be displayed on said display when the imaging object is not detected by said imaging object detection means.

14. A tracking apparatus, comprising:

imaging means for generating a plurality of images;

driving means for driving said imaging means to effect panning and tilting;

imaging object detection means for detecting an imaging object in an image generated by said imaging means by calculating a difference value of images of two successive frames generated by said imaging means such that a motion of the image is detected on the basis of the calculated difference value, a portion in said image in which said motion has been detected being initially set as said imaging object without user manipulation;

control means for controlling said driving means so that a position of the imaging object detected by said imaging object detection means coincides with a predetermined reference position of said image generated by said imaging means; and sound outputting means for outputting a predetermined sound when the imaging object is not detected by said imaging object detection means.

15. A tracking method for a tracking apparatus which includes imaging means for generating a plurality of images, driving means for driving said imaging means to effect panning and tilting, imaging object detection means for detecting an imaging object in an image generated by said imaging means, and control means for controlling said driving means so that a position of the imaging object detected by said imaging object detection means coincides with a predetermined reference position of said image generated by said imaging means, said method comprising the steps of:

detecting said imaging object in an image generated by said imaging means by calculating a difference value of images of two successive frames generated by said imaging means such that a motion of the image is detected on the basis of the calculated difference value, a portion in said image in which said motion has been detected being initially set as said imaging object without user manipulation;

providing audio output means; and outputting a predetermined sound when the imaging object is not detected by said imaging object detection means.

16. A tracking apparatus, comprising:

imaging means for generating a plurality of images;

driving means for driving said imaging means to effect panning and tilting;

imaging object detection means for detecting an imaging object in an image generated by said imaging means by calculating a difference value of images of two successive frames generated by said imaging means such that a motion of the image is detected on the basis of the calculated difference value, a portion in said image in which said motion has been detected being initially set as said imaging object without user manipulation;

control means for controlling said driving means so that a position of the imaging object detected by said imaging object detection means coincides with a predetermined reference position of said image generated by said imaging means; and light emitting means for emitting light when the imaging object is not detected by said imaging object detection means.

17. A television conference system, comprising:

a tracking apparatus for tracking an imaging object;

said tracking apparatus including:

imaging means for generating a plurality of images;

driving means for driving said imaging means to effect panning and tilting;

imaging object setting means for detecting motion in an image and for setting a portion in said image in which said motion has been detected as an imaging object, said imagine object setting means including motion detection means for calculating a difference value of images of two successive frames generated by said imaging means and for detecting said motion of the image based on the calculated difference value such that said portion in said image in which said motion has been detected is initially set as said imaging object without user manipulation;

imaging object detection means for detecting the imaging object set by said imaging object setting means in said plurality of images generated by said imaging means;

control means for controlling said driving means so that a position of the imaging object detected by said imaging object detection means coincides with a predetermined reference position of said image outputted from said imaging means; and frame display control means for superimposing a frame around said imaging object on said image when said imaging object detection means has detected said imaging object, said frame display control means modifying said frame if said imaging object is no longer detected.

* * * * *